(12) United States Patent
Mortari (10) Patent No.: US 11,526,782 B2
(45) Date of Patent: Dec. 13, 2022

(54) INFERRING DEPENDENCIES, REQUIREMENTS, AND PRODUCTIONS FROM SPREADSHEET-BASED LOOSELY-COUPLED DECISION TABLES

(71) Applicant: Red Hat, Inc., Raleigh, NC (US)

(72) Inventor: Matteo Mortari, Milan (IT)

(73) Assignee: Red Hat, Inc., Raleigh, NC (US)

( * ) Notice: Subject to any disclaimer, the term of this patent is extended or adjusted under 35 U.S.C. 154(b) by 376 days.

(21) Appl. No.: 16/776,710

(22) Filed: Jan. 30, 2020

(65) Prior Publication Data
US 2021/0241129 A1  Aug. 5, 2021

(51) Int. Cl.
*G06N 5/04* (2006.01)
*G06F 9/38* (2018.01)
*G06F 16/22* (2019.01)
*G06F 16/28* (2019.01)

(52) U.S. Cl.
CPC ............ *G06N 5/04* (2013.01); *G06F 9/3838* (2013.01); *G06F 16/221* (2019.01); *G06F 16/2282* (2019.01); *G06F 16/284* (2019.01)

(58) Field of Classification Search
CPC ... G06F 16/221; G06F 16/2282; G06F 9/3838
USPC ............... 707/791; 717/110; 706/46
See application file for complete search history.

(56) References Cited

U.S. PATENT DOCUMENTS

| | | | |
|---|---|---|---|
| 9,164,977 B2 | 10/2015 | Byron et al. | |
| 2004/0034848 A1* | 2/2004 | Moore | G06N 5/047 717/110 |
| 2010/0321407 A1 | 12/2010 | Mital et al. | |
| 2014/0324472 A1* | 10/2014 | Delaney | G16H 10/60 705/3 |

OTHER PUBLICATIONS

Samuel Kolb et al., "Learning constraints in spreadsheets and tabular data", Sep. 25, 2016, pp. 1-28, Belgium.
Matteo Mortari, "Inferring dependencies, requirements and productions from spreadsheet-based loosely coupled decision tables", pp. 1-5.

* cited by examiner

*Primary Examiner* — Hung T Vy
(74) *Attorney, Agent, or Firm* — Womble Bond Dickinson (US) LLP (57) ABSTRACT

A method includes receiving a spreadsheet file representing a plurality of decision tables, wherein the spreadsheet file does not indicate dependencies between non-labeled inputs and non-labeled outputs of the plurality of decision tables. The method further includes, for a first decision table of the plurality of decision tables, identifying, in view of an identifier of a second decision table of the plurality of decision tables, a dependent input that comprises an output of the second decision table of the plurality of decision tables. The method further includes determining, by a processing device, in view of an ordering of columns in the spreadsheet file, remaining inputs and outputs of the first decision table.

17 Claims, 7 Drawing Sheets

INFERRING DEPENDENCIES, REQUIREMENTS, AND PRODUCTIONS FROM SPREADSHEET-BASED LOOSELY-COUPLED DECISION TABLES

TECHNICAL FIELD

Aspects of the present disclosure relate to spreadsheet-based, loosely-coupled decision tables, and more particularly, to inferring dependencies, requirements, and productions from spreadsheet-based, loosely-coupled decision tables.

BACKGROUND

Spreadsheets are computer applications for organization, analysis, and storage of data in tabular form. Information stored in spreadsheets may be manually modified, at which time related information stored in the spreadsheets may be dynamically modified.

Decision tables are a concise visual representation for specifying which actions to perform depending on given conditions. Decision tables may be algorithms whose output is a set of actions. Information expressed in decision tables may be representing in decision trees, programming language, and spreadsheets.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Decision tables are a concise visual representation for specifying which actions to perform depending on given conditions. Decision tables may be algorithms whose output is a set of actions. Information expressed in decision tables may be representing in decision trees, programming language, and spreadsheets. In one embodiment, each represented decision corresponds to a variable, relation or predicate whose possible values may be listed among condition alternatives. Each action may be a procedure or operation to perform, and the entries specify whether (or in what order) the action is to be performed for the set of condition alternatives to which the entry corresponds.

In one embodiment, inputs associated with a first variable of a decision table may be dependent upon an output associated with a second variable of the decision table. A spreadsheet file can be used to describe a set of Decision Tables. In order to evaluate them as a whole, it may be desirable to know which are the required Inputs, in order to trigger the evaluation of all the decision tables in the spreadsheet.

When such labels are not included in a decision table for processing, execution of such tables may be difficult, if not impossible. One solution includes having a human manually determine and provide such labels. Another solution may be to send an error message to the developer, requesting that such labels be provided. In some embodiments, including labels of inputs, outputs, and dependency relationships may be cumbersome, inefficient, or overly complicated for developers. In other embodiments, developers may simply forget to include such labels.

Advantageously, an implementation engine for this invention may determine which are the dependencies between decision tables, as the Output result of a specific decision table in the file, may be the input of another decision table. In one embodiment, the order of evaluation may be determined to satisfy the dependencies between all of the several decision tables. Finally, all Outputs can be collected as the global result of evaluation of the spreadsheet file representing the full set of decision tables. Advantageously, the embodiments provided herein infer dependencies, requirements (e.g., inputs) and productions (e.g., outputs) based on loosely coupling naming conventions in the spreadsheet (e.g., not including labeled inputs and outputs or indications of dependency).

In one embodiment, the embodiments described herein can be used to automatically infer inputs and outputs in the case of spreadsheet-based loosely coupled decision tables, in order for the user to have an easy, natural way to express more than one single decision table in the file and express dependencies between the several decision tables in the spreadsheet. Furthermore, this approach may be used to express a Decision Model and Notation (DMN) as a spreadsheet, and in turn automatically (e.g., without human interaction) convert a spreadsheet using these conventions as a DMN file.

In one embodiment, the operations described herein may include receiving a spreadsheet file representing a plurality of decision tables, wherein the spreadsheet file does not indicate dependencies between non-labeled inputs and non-labeled outputs of the plurality of decision tables. The operations may further include, for a first decision table of the plurality of decision tables, identifying, in view of an identifier of a second decision table of the plurality of decision tables, a dependent input that comprises an output of the second decision table of the plurality of decision tables. The operations may further include determining, by a processing device, in view of an ordering of columns in the spreadsheet file, remaining inputs and outputs of the first decision table. Advantageously, the embodiments described herein allow for more efficient computer systems, as they do not require decision tables to include labeled inputs and outputs. Furthermore, dependencies between decision tables need not be identified, allowing computer systems to operate on a broader range of data.

Figure 1A:
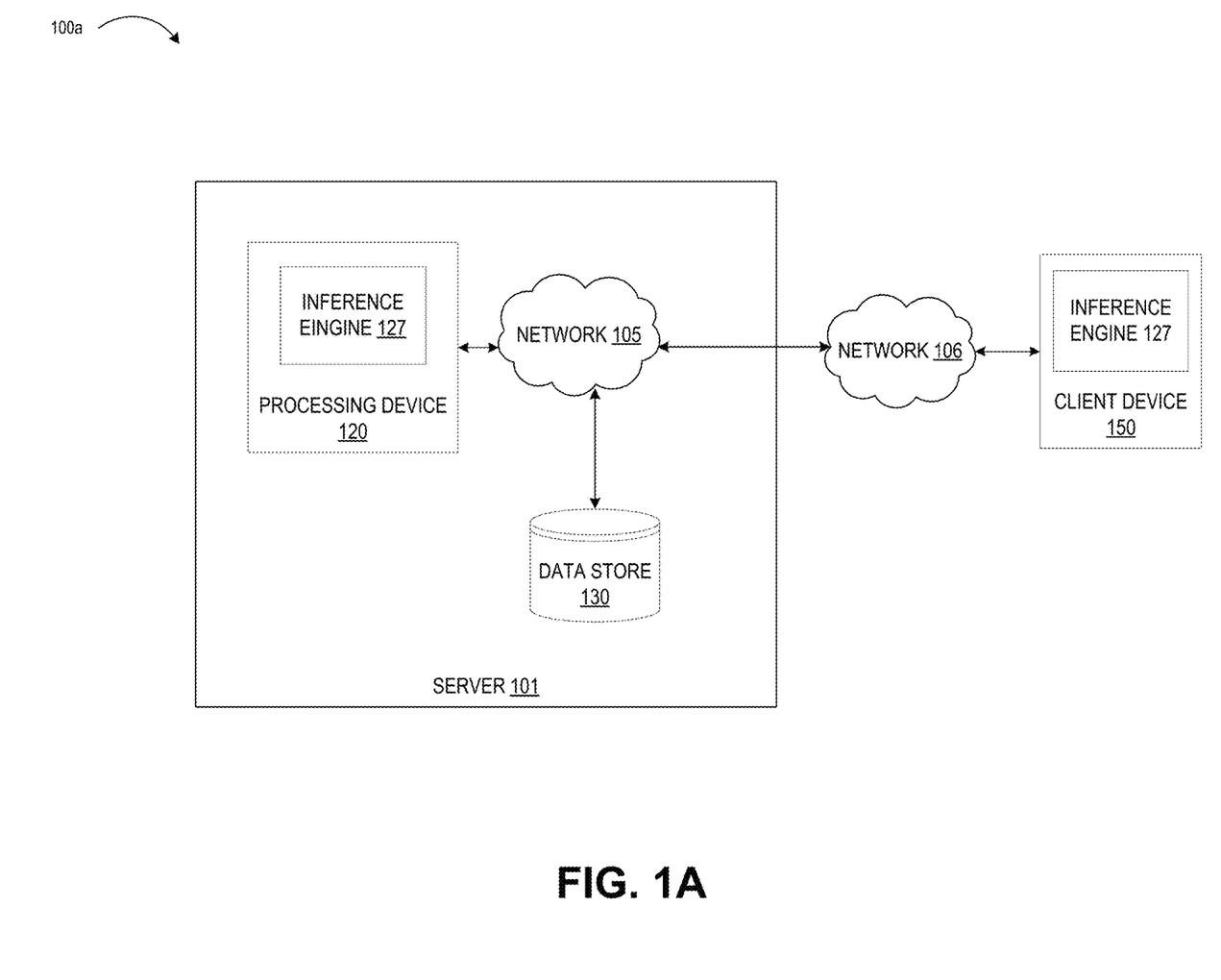
FIG. 1A is a block diagram that illustrates a first example system, in accordance with some embodiments of the present disclosure.

FIG. 1A is a block diagram that illustrates a first example system 100a, in accordance with some embodiments of the present disclosure. As discussed herein, inference engine 127 may include logic that enables the operations and systems described herein, when executed. In one embodiment, inference engine 127 resides in whole or in part on a server (e.g., server 101) of system 100a. In another embodiment, inference engine 127 resides in whole or in part on a client device (e.g., client device 150) of system 100a. In yet another embodiment, inference engine 127 resides in whole or in part on any combination of the two, or in a different system entirely.

Server 101 may include various components, which may allow inference engine 127 to run on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes an inference engine 127, a computing processing device 120, a data store 130, and a network 105. The inference engine 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include inference engine 127, in addition to, or alternatively from, server 101. Further implementation details of the operations performed by system 101 are described with respect to FIGS. 1B-6.

Figure 1B:
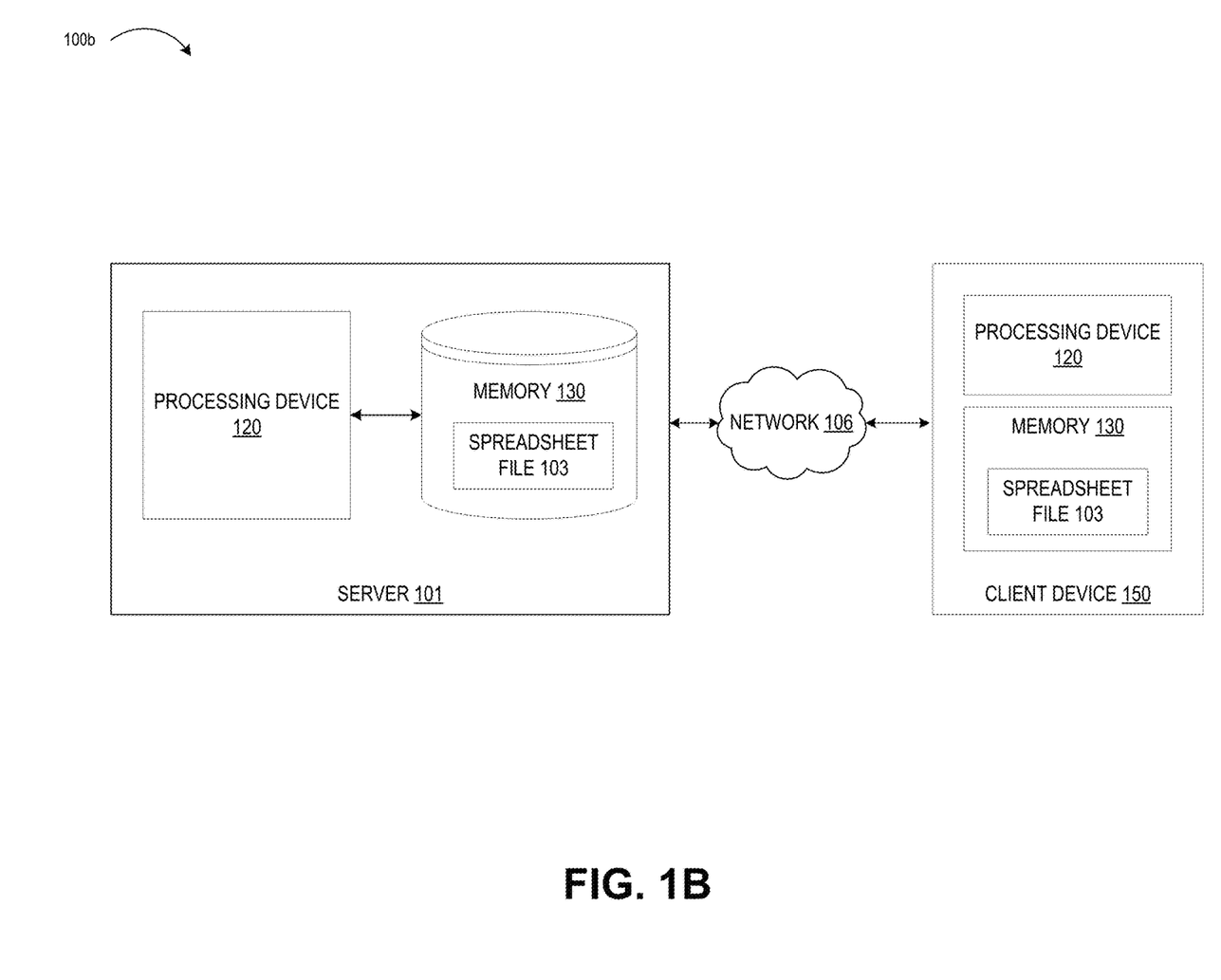
FIG. 1B is a block diagram that illustrates a second example system, in accordance with some embodiments of the present disclosure.

FIG. 1B is a block diagram that illustrates a second example system 100b, in accordance with some embodiments of the present disclosure. System 100b includes a server 101, a client device 150, or both a server 101 and a client device 150. In one embodiment, system 100b may include a memory 130 to store a spreadsheet file 103. In one embodiment, Server 101 and client device 150 may be connected via a network 106.

In one embodiment, server 101 and/or client device may perform inference operations, as described herein. For example, in one embodiment, processing device 120 may receive the spreadsheet file 103 representing a plurality of decision tables. In one embodiment, the spreadsheet file 103 does not indicate dependencies between non-labeled inputs and non-labeled outputs of the plurality of decision tables. Processing device may further, for a first decision table of the plurality of decision tables, identify, in view of an identifier of a second decision tablet of the plurality of decision tables, a dependent input that comprises an output of the second decision table of the plurality of decision tables. Processing device 120 may further determine, in view of an ordering of columns in the spreadsheet file, remaining inputs and outputs of the first decision table.

Figure 2:
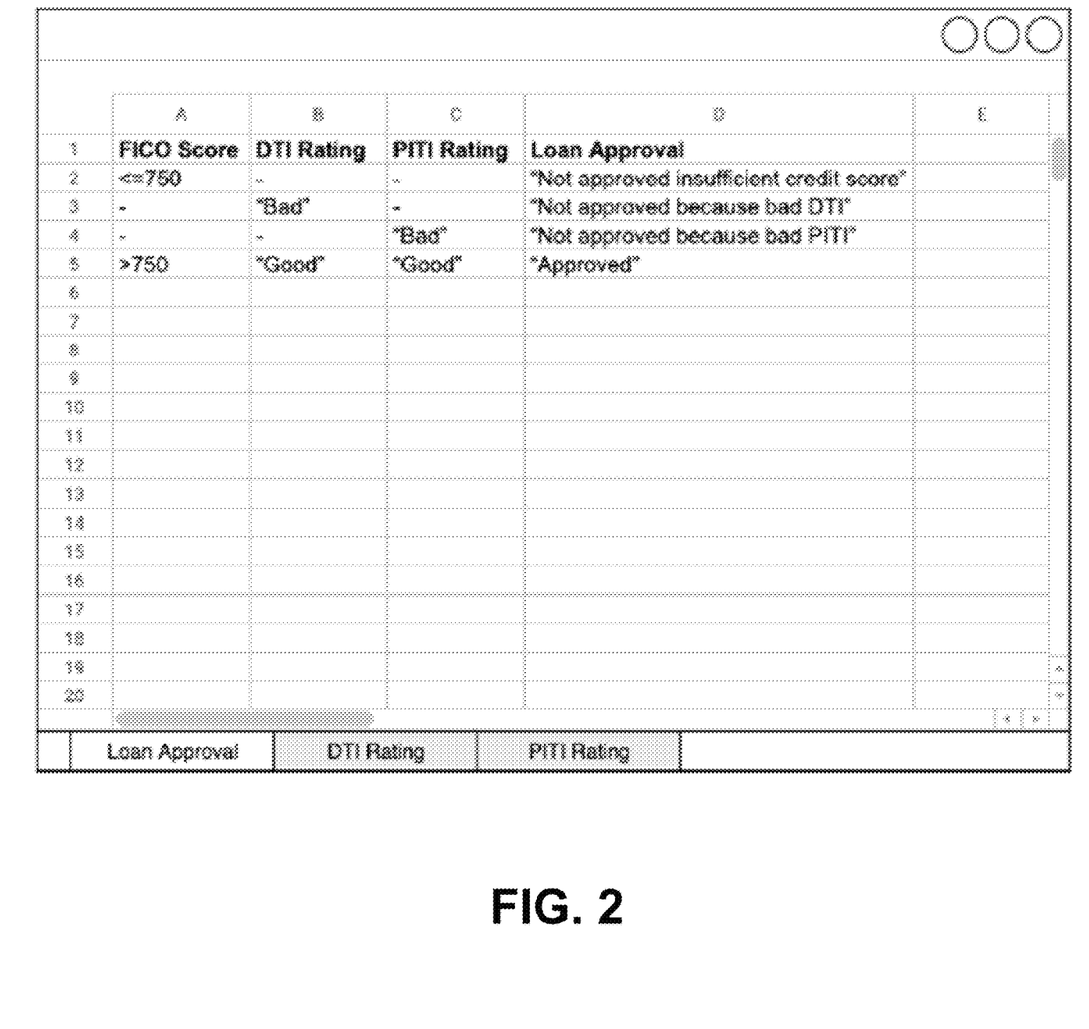
FIG. 2 is a block diagram that illustrates an example decision table, in accordance with some embodiments of the present disclosure.
Figure 3:
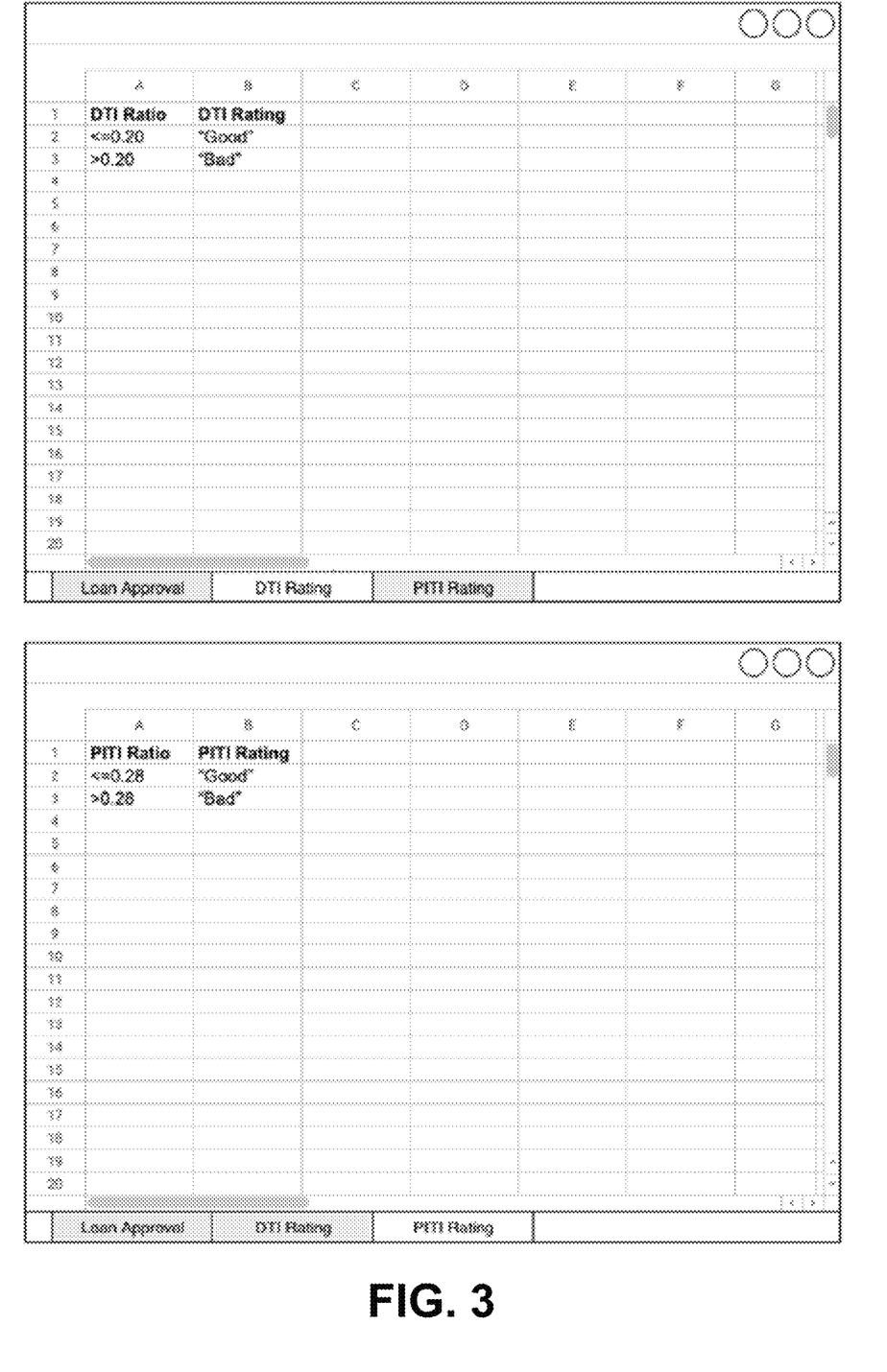
FIG. 3 is a block diagram that illustrates a plurality of example dependent decision tables, in accordance with some embodiments of the present disclosure.

FIGS. 2 and 3 are block diagrams that illustrates example decision tables, in accordance with some embodiments of the present disclosure. In one embodiment, processing logic (e.g., of inference engine 127) may analyze the decision tables and generate the following data structure, for example:

| Spreadsheet Tab name | Decision Table Header |
|---|---|
| Loan Approval | [FICO Score, DTI Rating, PITI Rating, Loan Approval] |
| DTI Rating | [DTI Ratio, DTI Rating] |
| PITI Rating | [PITI Ratio, PITI Rating] |

In one embodiment, each spreadsheet tab includes a name, and represents a separate decision table by that name. In a first phase, processing logic may detect input dependencies between the decision tables (e.g., Loan Approval, DTI Rating, and PITI Rating). In the present example, processing logic may detect that "DTI Rating" and "PITI Rating" are decision tables. As DTI Rating and PITI rating are also detected as decision table headers for the Loan Approval decision table, processing logic may determine that they are inputs of the decision table "Loan Approval" to be received from the other two respective tables (DITI Rating and PITI Rating) in the spreadsheet file.

As such, DTI Rating and PITI rating can be flagged, or otherwise labeled as dependent inputs, e.g.:

| Spreadsheet Tab name | Decision Table Header |
|---|---|
| Loan Approval | [FICO Score, DTI Rating, PITI Rating, Loan Approval] |
| DTI Rating | [DTI Ratio, DTI Rating] |
| PITI Rating | [PITI Ratio, PITI Rating] |

In one embodiment, in a second phase, processing logic may detect global inputs and table outputs. Referring to the above example, for decision table "Loan Approval": processing logic may determine that "FICO Score" represents a global input, because it is located on the left of the dependent inputs DTI Rating and PITI Rating, while "Loan Approval" may be determined to be an output of the decision table because it is located on the right of the dependent inputs. In another embodiment, processing logic may make the determinations based on the cell information residing at various other suitable locations (e.g., inputs may be on the right, with outputs in the left; inputs on top with outputs on bottom; inputs on bottom with outputs on top; etc.).

For decision tables "DTI Rating" and "PITI Rating", processing logic may determine that the decision tables do not include any dependent inputs, as the detected headers do not identify any other decision table names (tabs). In this case, processing logic may determine that the right-most single column is the single output of the decision table (e.g., DTI Rating and PITI Rating, respectively), while any other remaining column may be inferred as input for the decision tables. In other embodiments, processing logic may determine that inputs are in any other suitable location for decision tables without dependent inputs.

In one embodiment, if global inputs are located to the right of the detected dependent inputs processing may encounter an error when attempting to process the decision tables. In such a case, processing logic may provide a warning to a client device, indicating that the data should be relocated. In another embodiment, processing logic may perform the relocation dynamically, e.g., itself without further input from a human.

Notably, the spreadsheet file in the above example did not include labeled inputs (e.g., non-labeled inputs and outputs were identified by processing logic) nor did it include any reference to, or indicating of, dependencies between inputs and outputs of various decision tables. Advantageously, using the operations and systems described herein, processing logic is able to infer input and output classifications, as well as dependencies between decision tables, without being provided such information.

According to the above, analysis, processing logic may generate the following example table:

| Decision Table | Decision Table Columns | |
|---|---|---|
| Loan Approval | Inputs: | FICO Score |
| | Input Dependencies: | DTI Rating, PITI Rating |
| | Outputs: | Loan Approval |
| DTI Rating | Inputs: | DTI Ratio |
| | Input Dependencies: | (none) |
| | Outputs: | DTI Rating |
| PITI Rating | Inputs: | PITI Ratio |
| | Input Dependencies: | (none) |
| | Outputs: | PITI Rating |

As such, processing logic may summarize global inputs and outputs as follows:

Global Inputs: FICO Score, DTI Ratio, PITI Ratio
Global Outputs: Loan Approval

In one embodiment, in order to globally evaluate the spreadsheet as a whole, processing logic may determine that it will need to supply the three detected global inputs, as they are not dependent inputs to be received from another decision table. Once supplied with the three global inputs, processing logic may proceed to evaluation of the decision tables, taking into consideration all the dependencies between the tables. As such, processing logic can also rely on the inferred information that in order to compute the table "Loan Approval", the other two tables "DTI Rating" and "PITI Rating" should be evaluated first; these latter two tables can be evaluated immediately as they don't have any dependencies on other tables. In one embodiment, after the tables have been evaluated, the global output "Loan Approval" is determined by processing logic. Additionally, all decision table output can be presented if needed for audit, debugging, or other suitable methodology.

Figure 4:
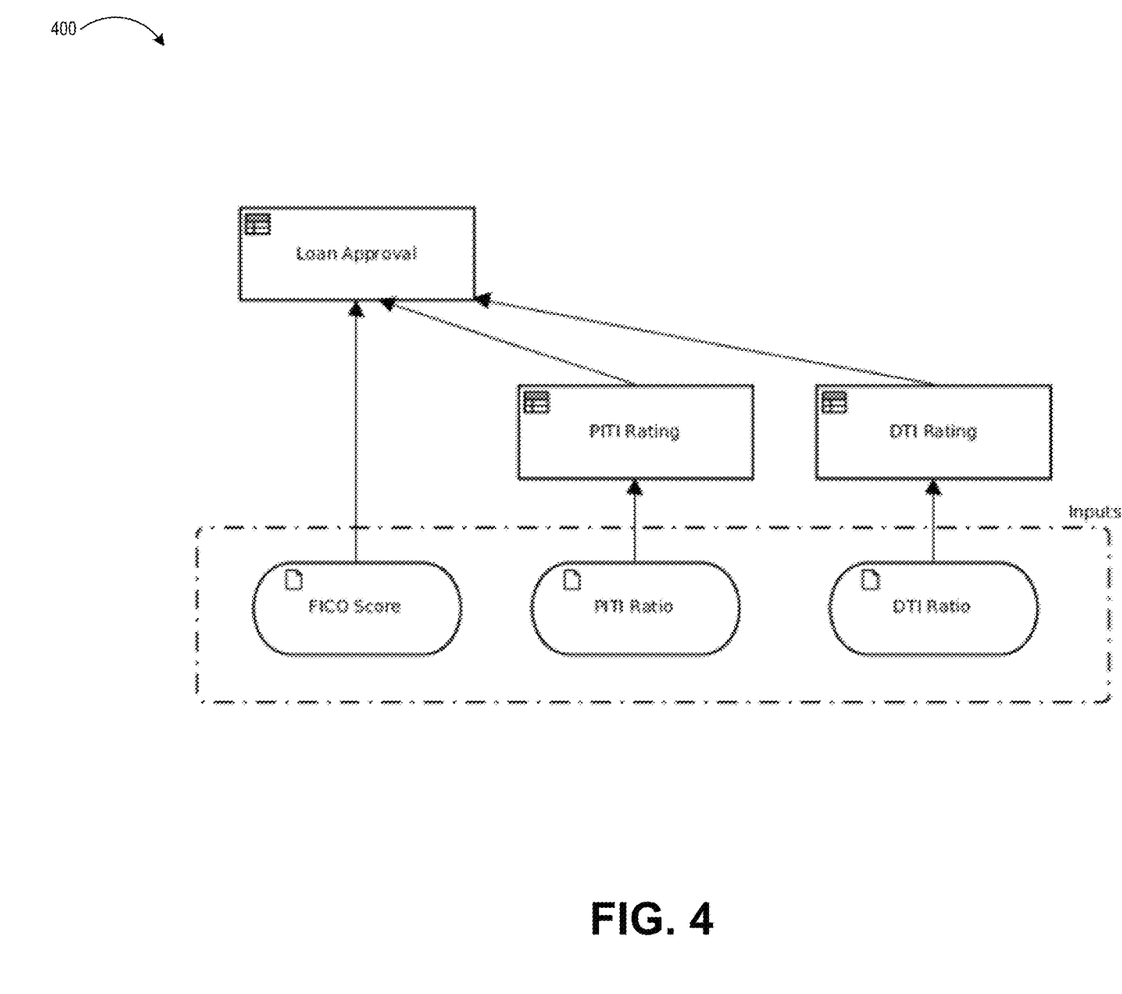
FIG. 4 is a flow diagram of Decision Requirements Graph 400, in accordance with some embodiments of the present disclosure.

FIG. 4 is a flow diagram of Decision Requirements Graph 400, in accordance with some embodiments of the present disclosure. As described herein, a DMN model may be described in a spreadsheet-like fashion where the DMN Decision logic is expressed as DMN decision table. For example, the spreadsheet example described above may be expressed in DMN with the Decision Requirements Graph (DRG) 400 illustrated in FIG. 4.

In one embodiment, the approaches described herein can be used to automatically infer inputs and outputs in the case of spreadsheet-based loosely coupled decision tables, in order for the user to have an easy, natural way to express more than one single decision table in the file and express dependencies between the several decision tables in the spreadsheet. Further, these approaches may be used to "express" a DMN model as a spreadsheet, and in turn automatically convert a spreadsheet using these conventions as a DMN file. Furthermore, it is contemplated that processing logic can simultaneously display spreadsheet and DMN graphical user interface (GUI) views of underlying decision tables. In such an example, user interaction with either the spreadsheet or the GUI may cause processing logic to modify the other in real-time, thus allowing users an easy and highly-visually way to make changes to otherwise highly complicated decision tables.

Figure 5:
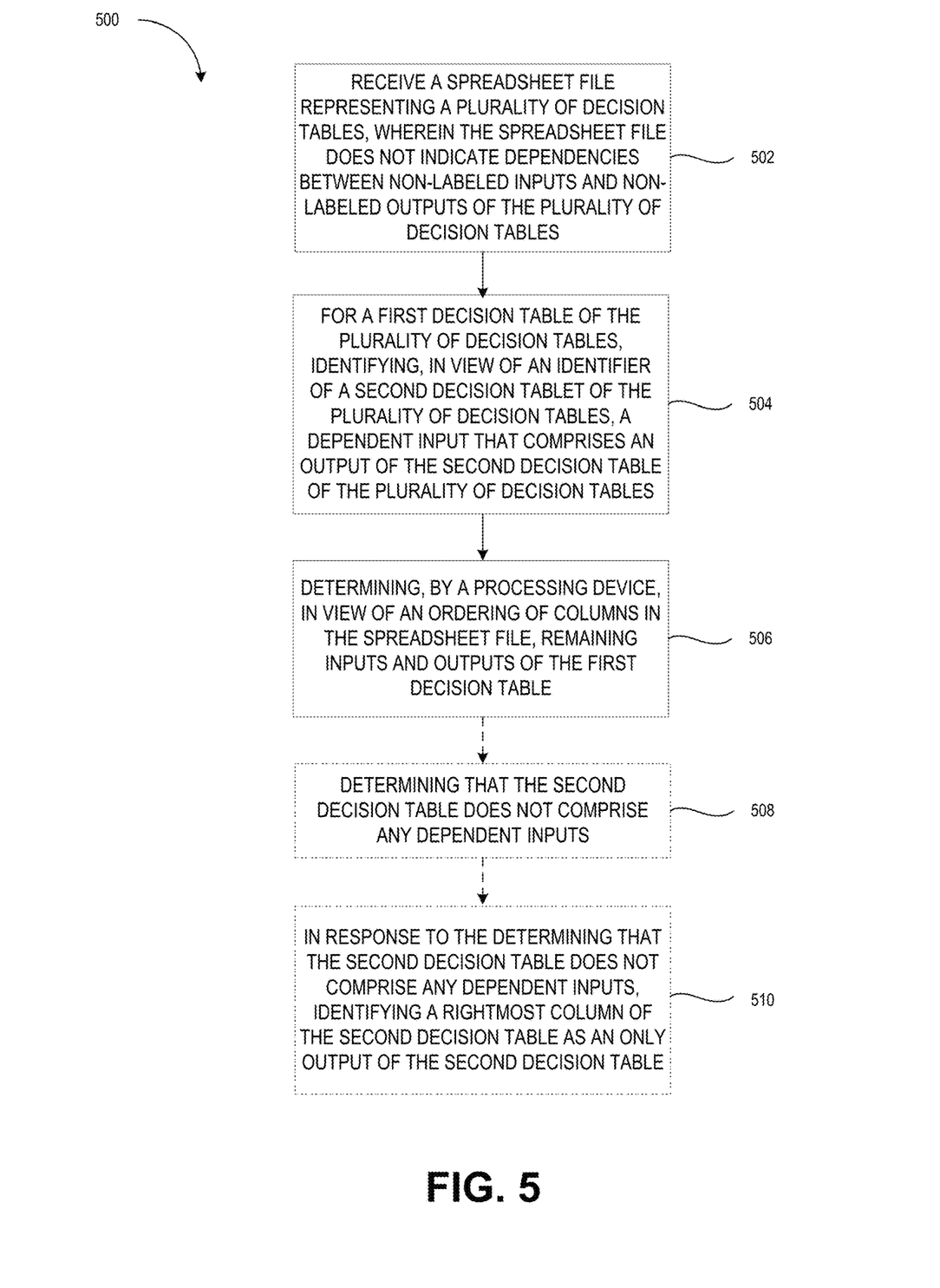
FIG. 5 is a flow diagram of a method of inference from spreadsheet-based, loosely-coupled decision tables, in accordance with some embodiments of the present disclosure.

FIG. 5 is a flow diagram of a method 500 of inference from spreadsheet-based, loosely-coupled decision tables, in accordance with some embodiments of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 5, at block 502, processing logic receives a spreadsheet file representing a plurality of decision tables. In one embodiment, the spreadsheet file may be received by a server device (e.g., server 101 or FIG. 1A) or a client device (e.g., client device 150 of FIG. 1A). In one embodiment, the spreadsheet file does not indicate dependencies between non-labeled inputs and non-labeled outputs of the plurality of decision tables. For example, inputs and output may appear the same, without any indicating of interdependencies.

In one embodiment, the spreadsheet file includes a plurality (e.g., more than one) of spreadsheet tabs, each respectively representing a corresponding decision table of the plurality of decision tables, wherein each tab identifies the corresponding decision table using the identifier. In one embodiment, a first row of a first tab of the spreadsheet file comprises a header of the first decision table. In another embodiment, cell contents of the first row comprise a plurality of names corresponding to inputs and outputs of the decision table.

At block 504, for a first decision table of the plurality of decision tables, processing logic may identify, in view of an identifier (e.g., a name) of a second decision table of the plurality of decision tables, a dependent input that comprises an output of the second decision table of the plurality of decision tables. For example, the dependent input of the first decision table may require the execution and output of the dependent input from a second decision table.

At block 506, processing logic may determine, by a processing device, in view of an ordering of columns in the spreadsheet file, remaining inputs and outputs of the first decision table. For example, as described herein, cells to the left of the dependent input (column) comprise inputs of the first decision table and cells to the right of the dependent input comprise outputs of the first decision table. In another embodiment, when the first decision table comprises a plurality of dependent inputs, the cells to the left of the plurality of dependent inputs may comprise inputs of the first decision table and cells to the right of the plurality of dependent inputs comprise outputs of the first decision table.

Optionally, at block 508, processing logic determines that the second decision table does not include any dependent inputs, and in response, at block 510, processing logic identifies a rightmost column of the second decision table as an only output of the second decision table.

In one embodiment, processing logic may provide results of the above operations to be displayed on an interactive graphical user interface (GUI), wherein modifications to the interactive GUI result in modifications to the spreadsheet file. For example, a DMN GUI (as illustrated in FIG. 4) may be generated by processing logic, allowing a user to interact with the DNM GUI to make underlying modifications to the spreadsheet file. In one embodiment, changes to the spreadsheet file may also result in real-time changes to the DMN GUI.

Figure 6:
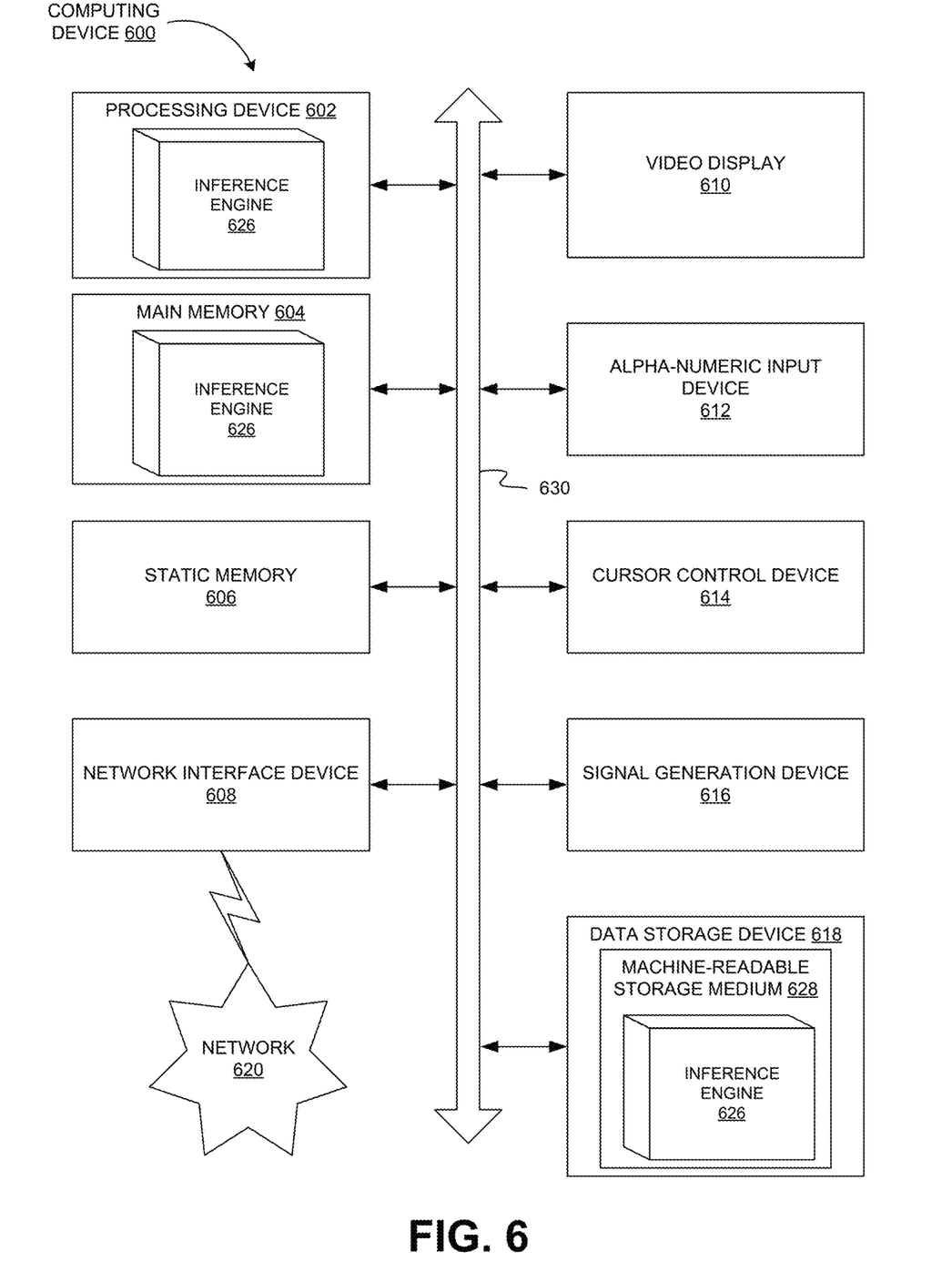
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein. In one embodiment, processing device 602 represents processing device 120 of FIG. 1A. In another embodiment, processing device 602 represents a processing device of a client device (e.g., client device 150 of FIG. 1A).

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions for carrying out the operations described herein, in accordance with one or more aspects of the present disclosure. Instructions implementing inference engine 626 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving", "determining", "encoding", "providing", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first", "second", "third", "fourth", etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
  receiving a spreadsheet file comprising a plurality of spreadsheet tabs, each spreadsheet tab representing a corresponding decision table of a plurality of decision tables;
  for a first decision table of the plurality of decision tables, identifying, in view of an identifier of a second decision table of the plurality of decision tables, a dependent input of the first decision table of the plurality of decision tables that comprises an output of the second decision table of the plurality of decision tables, wherein the first decision table of the plurality of decision tables corresponds to a first spreadsheet tab;
  determining, by a processing device, in view of an ordering of columns in the first spreadsheet tab, remaining inputs and outputs of the first decision table;
  determining, by the processing device, in view of an ordering of columns in a second spreadsheet tab, remaining inputs and outputs of the second decision table; and as a result of determining the remaining inputs and outputs of the first decision table and the remaining inputs and outputs of the second decision table, providing results of the determining to be displayed on an interactive graphical user interface (GUI).

2. The method of claim 1, wherein a first row of a first tab of the spreadsheet file comprises a header of the first decision table.

3. The method of claim 2, wherein cell contents of the first row comprise a plurality of names corresponding to inputs and outputs of the first decision table.

4. The method of claim 1, wherein cells to the left of the dependent input comprise inputs of the first decision table and wherein cells to the right of the dependent input comprise outputs of the first decision table.

5. The method of claim 1, wherein modifications to the interactive GUI result in modifications to the spreadsheet file.

6. The method of claim 1, further comprising:
determining that the second decision table does not comprise any dependent inputs; and
in response to the determining that the second decision table does not comprise any dependent inputs, identifying a rightmost column of the second decision table as an only output of the second decision table.

7. A system, comprising:
a memory to store a spreadsheet file comprising a plurality of spreadsheet tabs; and
a processing device operatively coupled to the memory, the processing device to:
receive the spreadsheet file comprising a plurality of spreadsheet tabs, each spreadsheet tab representing a corresponding decision table of a plurality of decision tables;
for a first decision table of the plurality of decision tables, identify, in view of an identifier of a second decision table of the plurality of decision tables, a dependent input of the first decision table of the plurality of decision tables that comprises an output of the second decision table of the plurality of decision tables, wherein the first decision table of the plurality of decision tables corresponds to a first spreadsheet tab;
determine, in view of an ordering of columns in the first spreadsheet tab, remaining inputs and outputs of the first decision table;
determine, by the processing device, in view of an ordering of columns in a second spreadsheet tab, remaining inputs and outputs of the second decision table; and
as a result of determining the remaining inputs and outputs of the first decision table and the remaining inputs and outputs of the second decision table, provide results of the determining to be displayed on an interactive graphical user interface (GUI).

8. The system of claim 7, wherein a first row of a first tab of the spreadsheet file comprises a header of the first decision table.

9. The system of claim 8, wherein cell contents of the first row comprise a plurality of names corresponding to inputs and outputs of the first decision table.

10. The system of claim 7, wherein cells to the left of the dependent input comprise inputs of the first decision table and wherein cells to the right of the dependent input comprise outputs of the first decision table.

11. The system of claim 7, wherein the first decision table comprises a plurality of dependent inputs, and wherein cells to the left of the plurality of dependent inputs comprise inputs of the first decision table and wherein cells to the right of the plurality of dependent inputs comprise outputs of the first decision table.

12. The system of claim 7, the processing device further to:
determine that the second decision table does not comprise any dependent inputs; and
in response to the determining that the second decision table does not comprise any dependent inputs, identify a rightmost column of the second decision table as an only output of the second decision table.

13. A non-transitory computer-readable storage medium including instructions that, when executed by a processing device, cause the processing device to:
receive a spreadsheet file comprising a plurality of spreadsheet tabs, each spreadsheet tab representing a corresponding decision table of a plurality of decision tables;
for a first decision table of the plurality of decision tables, identify, in view of an identifier of a second decision table of the plurality of decision tables, a dependent input of the first decision table of the plurality of decision tables that comprises an output of the second decision table of the plurality of decision tables, wherein the first decision table of the plurality of decision tables corresponds to a first spreadsheet tab;
determine, by a processing device, in view of an ordering of columns in the first spreadsheet tab, remaining inputs and outputs of the first decision table
determine, by the processing device, in view of an ordering of columns in a second spreadsheet tab, remaining inputs and outputs of the second decision table; and
as a result of determining the remaining inputs and outputs of the first decision table and the remaining inputs and outputs of the second decision table, provide results of the determining to be displayed on an interactive graphical user interface (GUI).

14. The non-transitory computer-readable storage medium of claim 13, wherein a first row of a first tab of the spreadsheet file comprises a header of the first decision table.

15. The non-transitory computer-readable storage medium of claim 14, wherein cell contents of the first row comprise a plurality of names corresponding to inputs and outputs of the first decision table.

16. The non-transitory computer-readable storage medium of claim 13, wherein cells to the left of the dependent input comprise inputs of the first decision table and wherein cells to the right of the dependent input comprise outputs of the first decision table.

17. The non-transitory computer-readable storage medium of claim 13, the processing device further to:
determine that the second decision table does not comprise any dependent inputs; and
in response to the determining that the second decision table does not comprise any dependent inputs, identify a rightmost column of the second decision table as an only output of the second decision table.

* * * * *